Oct. 19, 1926.
A. MEISSNER
BELT CLAMP
Filed Dec. 8, 1925
1,603,484
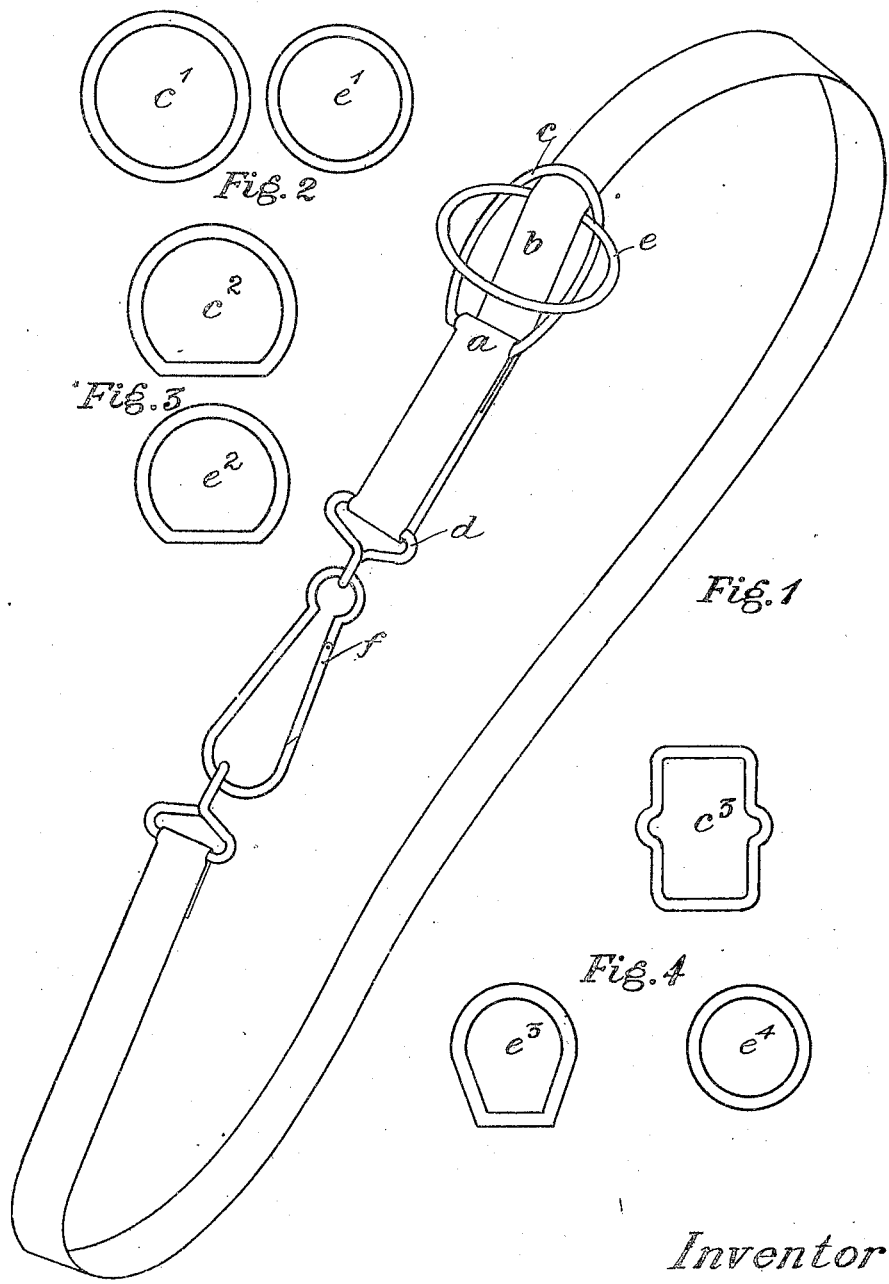
Inventor:
Arthur Meissner
by
Paul Fischland
Attorney Patented Oct. 19, 1926.

1,603,484

UNITED STATES PATENT OFFICE.

ARTHUR MEISSNER, OF POTSDAM, GERMANY.

BELT CLAMP.

Application filed December 8, 1925, Serial No. 74,132, and in Germany January 2, 1925.

This invention relates to a belt clamp more particularly for adjustable belts which are subjected to a heavy load. For example telegraph operators use adjustable belts by means of which the body of the operator, who is standing on a stay iron hooked to a telegraph post, is strapped to the post. Hitherto such belts were secured by the usual prong buckle of which the prong engaged with one of a number of holes in the belt. In such an arrangement the prong is liable to tear through the belt laterally so that the operator will fall. The same danger is liable to occur if it is necessary to adjust the belt when in use as it is necessary to release it for this purpose.

When using a belt clamp according to the present invention it is not necessary to provide the belt with holes and to open it for adjustment; the full strength of the belt is therefore always available. The adjustment is effected in a simple manner by a hand movement even with the strongest belts and the strength of the closure corresponds with the necessary requirements at any time. The new belt clamp consists substantially of two loose rings which are connected to the belt in the manner hereinafter described.

The clamp according to the invention is shown in the accompanying drawings wherein:

Figure 1 shows a perspective view of a complete belt, and

Figures 2, 3 and 4 show various forms of rings.

One end $a$ of the belt $b$ is rigidly secured to a ring $c$ by sewing or riveting. The belt is then passed over a bar or through a ring or eye or the like $d$ and then passes out from the bottom into the ring $c$ when it is passed through a second ring $e$, bearing from the top against the ring $c$, but without being able to be drawn through the ring $c$, and then passes out of the ring $c$ on the same side as that on which it was passed in.

When the belt is to be used for strapping a telegraph operator to a post the free end of the belt is returned to the eye $d$, and secured thereto by a strong spring hook. The connecting eye is preferably such that the plane of the spring hook is at right angles to the plane of the belt.

The rings $c$ and $e$ are in this case forged from bar iron 8 to 10 mm. in diameter. They may either be circular like the rings $c_1$ and $e_1$ in Figure 2, or they may be flattened on one side like the rings $c_2$ and $e_2$ in Figure 3, or the outer ring may be provided with oppositely disposed outward projections as shown in connection with the ring $c_3$ in Figure 4 whilst the inner ring may be of horse-shoe shape as shown at $e_3$ in Figure 4 or of circular shape shown at $e_4$ in Figure 4.

The belt clamp may also be used for other purposes such as for the tightening belts of climbing irons or for snow-shoe attachments and the like.

I claim:—

1. Belt clamp wherein a belt secured at one end to a ring ($c$) is passed around a bar or a ring ($d$) and then back into the first mentioned ring ($c$), and then passed through a second ring ($e$) and passed out of the first mentioned ring ($c$) on the same opening side as it is passed into this, but at a point sitauted diametrically opposite to its entrance point, substantially as described.

2. Safety belt having a clamp wherein the belt secured at one end to a ring ($c$) is passed around a bar or a ring ($d$) and then back into the first mentioned ring ($c$), then passed through a second ring ($e$), passed out of the first mentioned ring ($c$) on the same opening side as it is passed into this, but at a point situated diametrically opposite to its entrance point, and ultimately returned to the bar or ring ($d$) and detachably connected therewith.

In testimony whereof I affix my signature.

ARTHUR MEISSNER.